Figure 1:
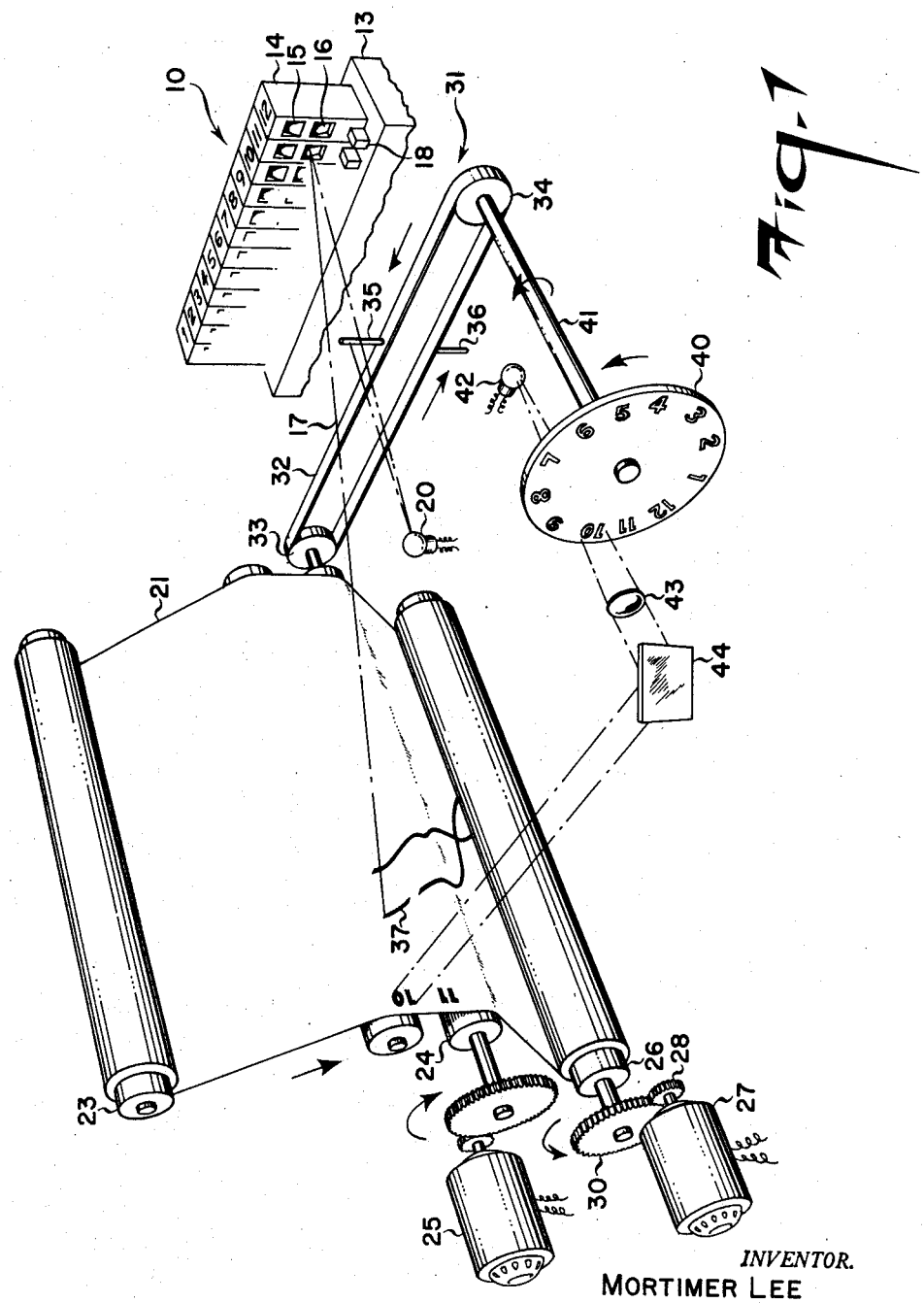

March 12, 1963 M. LEE 3,081,458
TRACE IDENTIFICATION DEVICE
Filed May 27, 1960 2 Sheets-Sheet 1

INVENTOR.
MORTIMER LEE
BY
Agent

March 12, 1963  M. LEE  3,081,458
TRACE IDENTIFICATION DEVICE
Filed May 27, 1960  2 Sheets-Sheet 2

INVENTOR.
MORTIMER LEE
BY
Agent

United States Patent Office 3,081,458
Patented Mar. 12, 1963

3,081,458
TRACE IDENTIFICATION DEVICE
Mortimer Lee, Granada Hills, Calif., assignor to Lockheed Aircraft Corporation, Burbank, Calif.
Filed May 27, 1960, Ser. No. 32,244
3 Claims. (Cl. 346—45)

The present invention relates to recording devices and more particularly, to a multiple trace recording device having incorporated therein means for identifying and distinguishing various traces recorded on a moving record medium.

In many industries, it has been conventional practice to employ scientific instruments such as oscillographs for the purpose of obtaining and recording information which when processed by suitable data reduction means can be used to properly evaluate and determine various tests characteristics. For example, in the aircraft industry, it has been the conventional practice to employ oscillographs for flight testing of aircraft so that various characteristics and parameters of flight characteristics can be determined under actual flying conditions. Conventional oscillographs generally incorporate a plurality of galvanometers and a light source which projects light beams onto rotatable mirrors in the galvanometers so that the beam is reflected onto a receiving photographic paper medium for recording. As the paper medium is rolled past the light beam, a continuous record is placed on the photographic recording medium by the light beams. Most oscillographs provide for at least twelve galvanometers so that twelve channels or record tracings can be recorded on the photographic recording medium representing at least twelve characteristics or parameters of the aircraft or device undergoing tests.

Difficulties have been encountered in identifying or reducing data contained on oscillograph recording records since in many instances, the tracings made by separate adjacent galvanometers when extreme deflections of the light beam representing one channel cross and recross light beam traces made by light beams representing other channels. The final record when processed contains the traces representing the twelve channels, but the traces are sometimes so intermixed that great difficulty is encountered in following an individual trace from beginning to end. Generally, the information contained on the oscillograph record is read visually and manually recorded on other record mediums for automatic data processing. Conventionally, trace identification on the oscillograph record comprises using trace interruptions at particular time positions of each interruption relative to positions of interruptions on other traces. However, this conventional method of trace identification does not solve problems associated with identifying traces which are intermixed and which cross and recross traces made by other channels.

These difficulties are obviated in accordance with the present invention by employing a novel trace identification device in oscillographs by providing a trace interrupter for each channel which is synchronized with a plurality of numbers circumferentially disposed on a rotating disc so that as each light beam trace is interrupted, the number of the trace will be printed on the record at the same time and in the same manner as the channel galvanometer trace is printed on the record. The present invention exposes on the paper above or below the interruption, the number of the galvanometer whose light beam is being interrupted; therefore, each trace on the recording paper can be positively identified without reference to any other trace. The fact that some traces are missing is immediately apparent because no trace will be interrupted in line with a recorded number.

Therefore, it is a primary object of the present invention to provide a novel trace identification means for identifying oscillograph records which enables data handling personnel to quickly and directly identify recorded traces of an oscillograph record.

Another object of the present invention is to identify various tracings on a record medium without reference to other traces on the same medium which may or may not be included on the oscillograph record.

Still a further object of the present invention is to provide a novel trace identification system which eliminates the conventional necessity of counting trace interruptions or determining the sequence of trace interruptions to determine identification as currently practiced.

Figure 2:
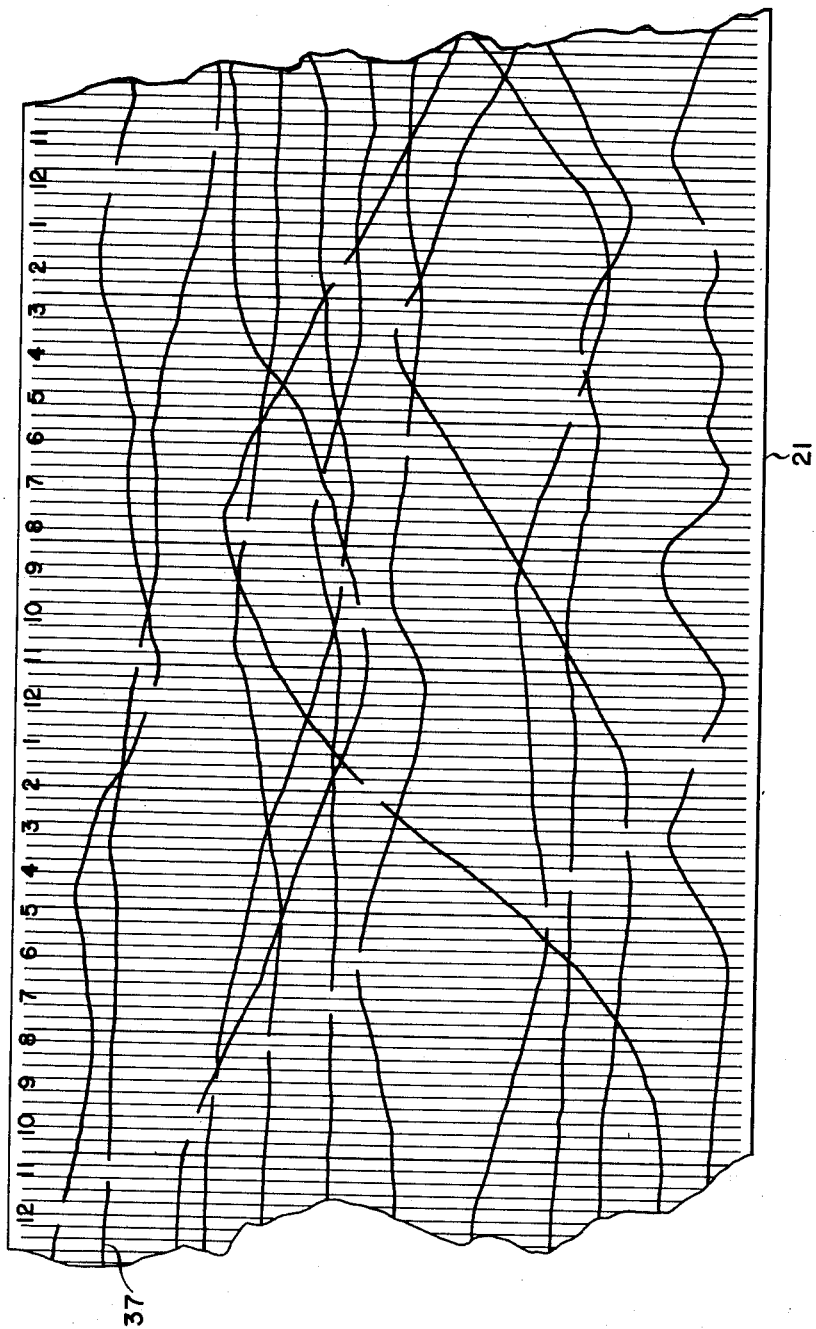

Other objects of the invention and the various advantages and characteristics of the present trace identification system will be apparent from a consideration of the following detailed description when taken in connection with the accompanying drawings in which like numbers of reference denote corresponding parts throughout the several views; in which FIGURE 1 is a diagrammatic drawing showing the trace identification system of the present invention employed in conjunction with the plurality of galvanometers as used in a recording oscillograph; and FIGURE 2 is a drawing representing a typical oscillograph recording record made by the trace identification system and apparatus shown in FIGURE 1.

With reference to FIGURE 1, the basic elements of a recording oscillograph are shown which comprise in general, a plurality of recording galvanometers indicated by the general reference 10 shown inserted into a magnetic retention block 13 and arranged numerically to represent at least twelve channels of information.

A typical galvanometer of this character comprises a lightweight fine wire coil held in suspension between a pair of stretched wires or ribbons respectively anchored at opposite ends to an enclosing galvanometer case such as case 14 of galvanometer 12. The suspension means defines the axis of rotary motion of the coil and supports a small mirror which is generally symetrically arranged about this axis for deflection responsive to rotation of the coil. A pair of windows 15 and 16 in the galvanometer case are aligned with the mirror to enable incidence and reflection of a light beam, such as beam 17, at the mirror for sensing coil displacement. Magnetic pole pieces 18 are mounted through opposite walls of the case to define a narrow gap interiorly of the case and within which the coil is located. The pole pieces extend outwardly of the caser for suitable engagement with magnetic means such as the magnetic block 13 of the oscillograph. The principle of operation of a galvanometer of this type together with its mode of use is thoroughly familiar in the art.

A first light source 20 is employed for projecting light energy through the galvanometer window 16 so that reflected beam 17 will emanate from the mirror through window 16 onto a photographic or light sensitive medium 21 such as sensitized paper for example. The light source is normally shielded from the photographic paper so that only the plurality of traces representing the various channels are projected onto the sensitized paper record.

The paper record is stored on a reel or roll 23 which is directed over a tension and record moving roller 24 to a takeup roll 26. Roll 26 is driven by a torque motor 27 through a gear train composed of a gear 28 meshed with gear 30 which is fixed to the takeup roll 26. Roll 24 is driven by a constant speed motor 25 during operation of the oscillograph to provide a dynamic recording of the channel traces placed on the record surface by the reflected light energy from the plurality of galvanometers.

In order to identify each trace made by the plurality of galvanometers, an interrupter means is provided which comprises a drive arrangement represented by the general reference numeral 31 which includes a belt 32 pulled taut about a driving wheel 33 and a slave wheel 34. The belt may be of a pulley and wheel variety or may be of a chain and sprocket type. On the outside surface of the belt there is provided a pair of light energy interrupter pins 35 and 36 which sequentially pass between the light source 20 and the plurality of galvanometers to interrupt incident light energy travelling therebetween. Wheel 33 is fixed to the record medium drive roller 24 so that the driving of the roller 24 will cause the rotation of the belt about the wheels 33 and 34. As pin 35, for example, passes between light source 20 and the galvanometer identified with channel 11, the light energy from light source 20 is interrupted so that light beam 17 will not fall upon the surface of record 21 as the record travels over rollers 24. This interruption will last as long as pin 35 is in this position. However, as long as the pin is travelling, the length of the interruption is relatively short and represents approximately a break in a trace 37 of approximately one-eighth inch in length. As can be seen in FIGURE 1, the interruption in trace 37 is achieved when pin 35 passes between light source 20 and the galvanometer associated with channel 11. In the position as shown, pin 35 is in the process of interrupting the light energy normally received by the galvanometer associated with channel 10 and the commencement of an interruption in a trace identifiable with channel 10 is being commenced.

In order to provide a numerical indication of the trace having an interruption and a selected relationship with respect to interruptions of other traces, a sequentially numbered disc 40 is attached a shaft 41 communicating with and attached to wheel 34 so that the rotation of wheel 34 will be transmitted into rotary movement of disc 40. Disc 40 is provided with a plurality of numbers about the periphery of the disc, such as number 10. Each number on the disc is characterized by the ability to pass light energy from one side of the disc to the other side while light passage on the number background is prohibited. The disc may be made of glass with the numbers etched out of a solid background or any other suitable means may be employed.

A simple optical system is employed for projecting numbers from disc 40 onto the sensitized record 21 which comprises, in general, a light source 42 for initiating light energy through the transparent numbers on disc 40 where a lens 43 receives the modified or modulated light energy passing through a particular number and projects this image onto a mirror 44 arranged at an angle to lens 43 so that the image is projected onto the sensitized paper 21. Inasmuch as the pins 35 and 36 are driven past the galvanometers at a rate which is synchronized with the rotation of disc 40 as its numbers pass light source 42, it can be seen that an interruption of a particular channel, such as channel 11 represented by trace 37 will be arranged on the record 21 directly beneath and in line with the numerical representation of that particular channel on the trace record which in the present instance is channel 11. The pins and the disc are synchronized so that as pin 35 is interrupting the trace associated with channel and galvanometer 12, number 12 on the disc will be between light source 42 and lens 43. When pin 35 has interrupted the trace associated with channel and galvanometer 1, pin 36 will be in approximate position to follow by interrupting the trace to be made in channel and galvanometer 12.

With reference to FIGURE 2, a typical oscillograph record 21 is shown having 12 traces or channels thereon wherein trace 37 represents the channel 11 made by galvanometer 11. It can be seen that trace 37 is interrupted directly in line with the numerical indicia 11 and that this trace is the only trace which is interrupted directly in line with that particular number. The same method of presentation holds true for all of the other traces shown on the record. That is, an interruption occurring in the trace will be located directly in line with the numerical indicia representative of that particular channel trace.

In actual operation, motor 27 is actuated so that takeup roller 26 will be rotated via the train of gears 28 and 30. As drive roller 24 rotates, the photo sensitized paper record 21 is drawn from roller 23 onto the takeup roller 26 past the reflected modulated light energy which records upon the sensitized surface of the record 21. A portion of the light energy received on the surface of record medium 21 is directed by the plurality of galvanometers wherein each galvanometer represents a separate channel of information to be recorded. These channels or traces of information appear substantially continuous and may cross and recross various channel traces.

As drive roller 24 rotates, pulley wheels 33 and 34 track with this rotation and cause belt 32 to carry pins 35 and 36 sequentially past the row of galvanometers so that the incident light energy to the galvanometers is sequentially interrupted. Thereby, an interruption in the continuous trace will occur for each and every reflected beam from the galvanometer.

To insure identification of the interruption and its association with each separate channel or trace, number disc 40 is rotated via pulley wheel 34 and shaft 41 so that the light energy from source 42 passes through transparent numerical indicia on the disc forming a numerical image which passes through lens 43 and is reflected by mirror 44 onto the surface of the record 21 at a point along one edge of the record simultaneously as an interruption is occurring in one trace. In this manner, the projected numerical image when associated with the interruption positively identifies the trace without further data reduction. By the use of numerical indicia associated with interruptions, trace identification can readily be made by visual or manual means.

It is to be noted that the device of the present invention requires no shutter or a short exposure time to photographically "stop" the image motion. The trace interrupter arrangement is geared to, or positively driven by, the paper drive synchronizing roller 24 so that the spacings of cycles of trace interruption will be constant. The number disc is geared and positively driven by the trace interrupter arrangement so that there will be one set of numbers per cycles of trace interruptions. This is provided for by the arrangement of pins 35 and 36. It is to be understood that more or less pins may be added or deleted as circumstances require.

Furthermore, the product of the magnification ratio of the number projecting lens 43 and the circumference of the circle numbers on the numbered disc should be equal to the paper travel per cycle of trace interruptions. Therefore, the image of the numbers will move through the projection plane at the same linear velocity as the paper. Hence, there will be no relative motion between the image and the paper and the image will print without smudging the photographic paper record 21.

Thereby, by employing the device of the present invention, missing traces do not affect the validity of trace identification. With only interruptions as identification as employed in conventional identification apparatus, missing traces make it extremely difficult to count the order of interruption. Sometimes, it has been found impossible to achieve this without the use of the present invention. Reference to other traces on the oscillograph is not required to identify traces and reference to a listing of traces is not required to establish trace number.

Having described only typical forms of the invention I do not wish to be limited to the specific details herein set forth, but wish to reserve to myself any variations or modifications that may appear to those skilled in the art and fall within the scope of the following claims.

I claim:

1. In a multiple-trace recorder wherein light energy is applied to a plurality of galvanometers and an independent trace to be recorded is produced by each of said galvanometers, apparatus for identifying each trace produced by a galvanometer while retaining the character of said trace, said apparatus comprising, a movable record medium having a light sensitive surface for receiving reflected light energy from each galvanometer, driving means for moving and storing the record medium, an interrupter arrangement operatively connected to the driving means to move past the plurality of galvanometers whereby light energy from a light energy source is interrupted sequentially and thereby producing a break in the continuous trace made by reflected light energy from each galvanometer, and means operably connected to the driving means via the interrupter arrangement and synchronized therewith for applying indicia along the side of the record medium in a direct transverse line with each break produced by said interrupter arrangement whereby each trace interruption is identified by indicia.

2. In a multiple-trace recorder wherein light energy is applied to a plurality of galvanometers and an independent trace to be recorded is produced by each of said galvanometers in the form of modulated reflected light energy, apparatus for identifying each trace produced by a galvanometer while retaining the character of said trace, said apparatus comprising, a movable record medium having a light sensitive surface for receiving the modulated reflected light energy through a projection plane from each galvanometer, a drive means for moving the record medium past the light energy projection plane, an interrupter arrangement operatively connected to the drive means to move past the plurality of galvanometers to interrupt applied incident light energy to the plurality of galvanometers sequentially and thereby producing a break at predetermined intervals in the continuous trace made by reflected light energy from each galvanometer, the breaks in the traces made by the plurality of galvanometers presenting sequential interruptions in a step-by-step fashion, an indicia identification arrangement, and means operably connecting the drive means to the indicia identification arrangement via the interrupter arrangement and synchronized therewith for applying indicia through the projection plane along the side of the record medium in a direct transverse line with each break produced by said interrupter arrangement whereby each trace interruption is identified by said applied indicia.

3. In combination with apparatus for recording modulated reflected light energy traces on a light sensitive record including a plurality of galvanometers for producing individual and independent traces by each of said galvanometers on said record, drive means for moving the record at a constant rate past a projection plane through which is transmitted modulated light energy from each galvanometer, an interrupter arrangement operatively driven by the driving means to sequentially interrupt incident light energy applied to the plurality of galvanometers so that the traces produced on the record include sequential interruptions in a step-by-step manner, optical means for projecting a light image representative of predetermined indicia through the projection plane onto the moving record whereby an interruption of each trace is identified by the said indicia, and mechanical means connecting the optical means to the interrupter arrangement for simultaneously applying said indicia on the record with an interruption corresponding to the numerically equivalent galvanometer trace, said light image projection means including a numerical transparent disc rotatably connected to the interrupter arrangement and optical means including a light source for forming a numerical image and projecting said image through the projection plane whereby said image is applied to the record medium in direct line with a break in the applied trace associated with a given galvanometer.

References Cited in the file of this patent
UNITED STATES PATENTS

| Re. 22,881 | Del Riccio | May 20, 1947 |
| 2,313,091 | Renner | Mar. 9, 1943 |
| 2,635,034 | Haviland | Apr. 14, 1953 |